United States Patent
McClellan et al.

(10) Patent No.: US 6,739,513 B1
(45) Date of Patent: May 25, 2004

(54) BOX DETECTOR IN BARCODE ENVIRONMENT

(75) Inventors: Richard P. McClellan, Penngrove, CA (US); Lihu Chiu, Arcadia, CA (US)

(73) Assignee: RJS Systems International, Santa Fe Springs, CA (US)

(*) Notice: Subject to any disclaimer, the term of this patent is extended or adjusted under 35 U.S.C. 154(b) by 210 days.

(21) Appl. No.: 09/655,477

(22) Filed: Sep. 5, 2000

(51) Int. Cl.$^7$ ................................................ G06K 7/10
(52) U.S. Cl. .............. 235/462.14; 235/454; 235/462.31
(58) Field of Search ........................... 235/454, 462.14, 235/462.31, 462.01, 470

(56) References Cited

U.S. PATENT DOCUMENTS

| | | | | |
|---|---|---|---|---|
| 4,652,750 A | | 3/1987 | Eastman et al. ............. 250/239 |
| 4,933,538 A | | 6/1990 | Heiman et al. .............. 235/462 |
| D319,228 S | | 8/1991 | Mori et al. ................. D14/116 |
| 5,260,554 A | * | 11/1993 | Grodevant ............. 235/462.31 |
| 5,332,892 A | | 7/1994 | Li et al. ...................... 235/462 |
| 5,525,788 A | | 6/1996 | Bridgelall et al. .......... 235/462 |
| 5,525,810 A | | 6/1996 | Jewell et al. ................ 250/566 |
| 5,557,093 A | | 9/1996 | Knowles et al. ............. 235/462 |
| 5,637,854 A | | 6/1997 | Thomas ....................... 235/462 |
| 5,679,941 A | * | 10/1997 | Iizaka et al. ................. 235/383 |
| 5,742,041 A | | 4/1998 | Liu ............................. 235/462 |
| 5,828,048 A | * | 10/1998 | Rockstein et al. ..... 235/462.01 |
| 5,914,477 A | | 6/1999 | Wang ....................... 235/462.1 |
| 6,129,280 A | * | 10/2000 | De Renzis et al. ..... 235/462.22 |
| 6,135,352 A | * | 10/2000 | Girotti ......................... 235/454 |
| 6,257,490 B1 | * | 7/2001 | Tafoya .................. 235/462.07 |
| 6,325,289 B1 | * | 12/2001 | Mazzone ................ 235/462.14 |
| 6,332,544 B1 | * | 12/2001 | Mitani ......................... 209/559 |
| 6,357,659 B1 | * | 3/2002 | Kelly et al. ............ 235/462.01 |
| 6,371,371 B1 | * | 4/2002 | Reichenbach ............... 235/454 |
| 6,502,750 B1 | * | 1/2003 | Barnes et al. .......... 235/462.01 |
| 6,540,139 B1 | * | 4/2003 | Lucera et al. .......... 235/462.01 |

FOREIGN PATENT DOCUMENTS

WO WO 99/17148 4/1999

* cited by examiner

Primary Examiner—Thien M. Le
Assistant Examiner—April Nowlin
(74) Attorney, Agent, or Firm—Leon D. Rosen

(57) ABSTRACT

A system where boxes (12) move along a conveyor belt and a bar code scanner reads bar codes (20) on the boxes and detects the presence of a box (with or without a readable barcode), which facilitates establishing a box detector that detects the leading edge of a box. The bar code scanner has a scanning laser beam source (30) that directs a scanning laser beam (32) at the path of bar codes on the boxes, and a sensor (44) that detects reflections of the laser beam, so the output from the sensor can be used by a bar code reader (52) to read bar codes. Instead of setting up a separate box detector, the output from the laser reflection sensor is delivered to a container detecting circuit (102) that uses the output of the laser reflection sensor to detect the leading edge of the box. The container detecting circuit detects a rapid increase in output from the sensor from a level (122) obtained when no box is present to a level B3 commonly exceeded by an ordinary box surface, with the circuit constructed to avoid false detections resulting from black or brown bars elements interspersed with highly reflective space elements of a bar code.

4 Claims, 3 Drawing Sheets

BOX DETECTOR IN BARCODE ENVIRONMENT

BACKGROUND OF THE INVENTION

Boxes or other containers are commonly tracked by attaching a bar code label or by printing a bar code directly on the box. The boxes are commonly moved by a conveyor belt or other transport along a predetermined path, where the bar codes are read and the leading edges of the boxes are detected. In one example, each box is deflected onto one of a plurality of locations depending upon the destination indicated by the bar code, or whether there is no bar code, when the leading edge of the box reaches a diverting device. In the prior art, a laser beam scanning source and reflection sensor had to be set up to read the bar codes, and a separate box detector had to be set up. The cost for the separate setups, whose relative positions might have to be accurately established, added to the cost of the box handling system. A box handling system that required less time and labor to set up the system, would be of value.

SUMMARY OF THE INVENTION

In accordance with one embodiment of the present invention, a system is provided, of a type that directs a scanning laser beam at bar codes on moving containers and that detects laser beam reflections for delivery to a bar code reader, which includes apparatus for detecting the containers at minimal additional cost. The apparatus for detecting each container includes a circuit having an input connected to the reflected laser beam sensor to receive the signals representing laser reflections from the containers. In addition to reading bar codes, the apparatus generates a "box-detected" signal when it detects a box whether or not the box has a readable bar code.

The container detecting circuit indicates detection of the container when the magnitude of the output from the laser reflection sensor increases from a low level representing no container, to above a predetermined level that represents reflections from a container. The container detecting circuit has a circuit part that ignores an increase in reflectance resulting from a bar code space element that follows a brief decrease from an adjacent bar code line element.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
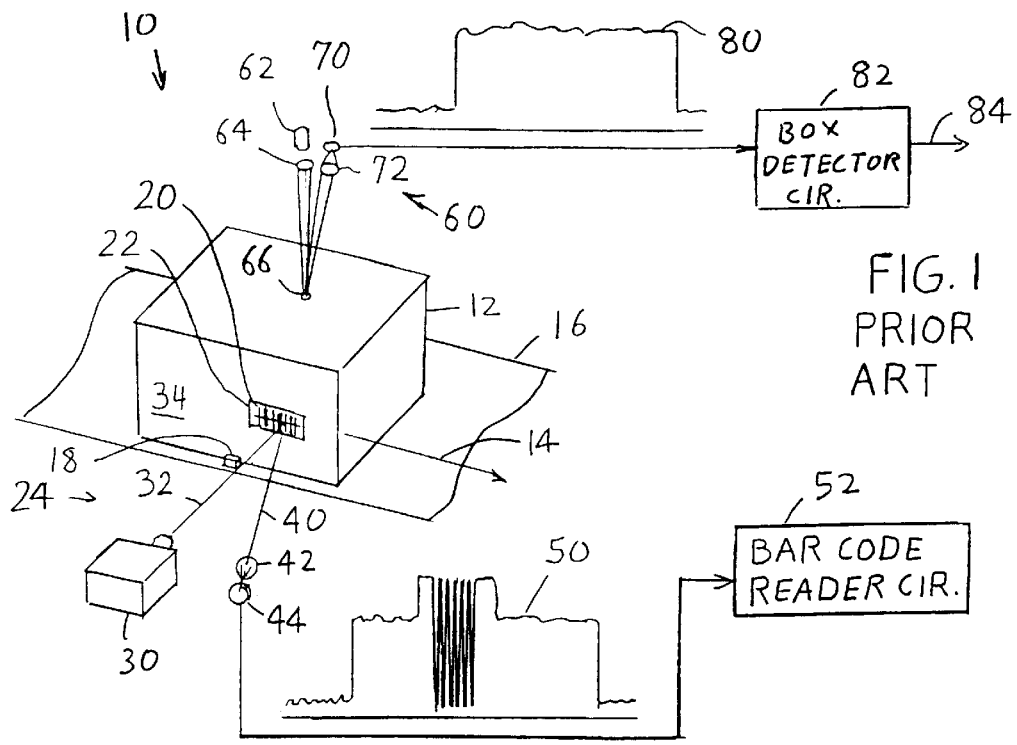
FIG. 1 is a partial isometric view of a prior art system for reading bar codes on boxes moving along a conveyor belt and for detecting the presence of each box as it reaches a position adjacent to the bar code reader, including graphs showing the characteristics of signals from detectors.

FIG. 1 illustrates a prior art system 10, where containers such as boxes 12 move along a predetermined path 14 along a conveyor belt 16. A guide 18 locates a front surface of each box. Each box contained a bar code 20, with a bar code printed on a label 22 being indicated. A bar code reading subsystem 24, including a source 30 for a scanning laser beam 32 was positioned a predetermined distance from the path of the surfaces 34 of the boxes containing the bar codes. As the bar code on each box passed the scanning laser beam 32, reflections 40 from the laser beam were concentrated by a lens 42 onto a photodetector or sensor 44. The graph 50 represents the output of the sensor (at the center of each scan). The output of the sensor was delivered to a bar code reader circuit 52, which generally included a programmed computer that detected and read the bar code. The bar code reader distinguishes between markings representing a bar code and those not representing a bar code, and then it detects bar code elements (bars and spaces) and compares them to characters in a lookup table to thereby read the bar code. In one example, a device pushes the boxes off the conveyor belt onto one of many platforms that each gathers all boxes to be delivered to one customer or to one area, etc.

The prior art system also included a box detector 60 which detected the presence of a box as by detecting the leading edge of each box as it reached a position adjacent to the bar code reader apparatus. The box detector 60 included a source 62 of light such as a light emitting diode, a lens 64 that concentrated the light onto a spot 66 on a surface of the box, a light detector 70, and a lens 72 that focused an image of the spot 66 onto the infrared detector 70. Graph 80 indicates variation in output of the detector 70 as a box passes it. A box detector circuit 82 delivered an output 84 that indicated that the leading edge of a box was detected. In one example, if a box is detected but no readable bar code is detected for that box, then the box is pushed out onto a location for defective boxes, so a bar code can be applied. For the particular setup in FIG. 1, the output of the detector 70 remains very low when no box is present, because then the light detector detects only a small amount of light from the conveyor belt.

Whenever a bar code is to be read, the bar code reading subsystem 24 must be acquired and set up. However, the addition of the box detector 60, especially the need to install its components, adds to the overall cost of the detecting system 10.

Figure 2:
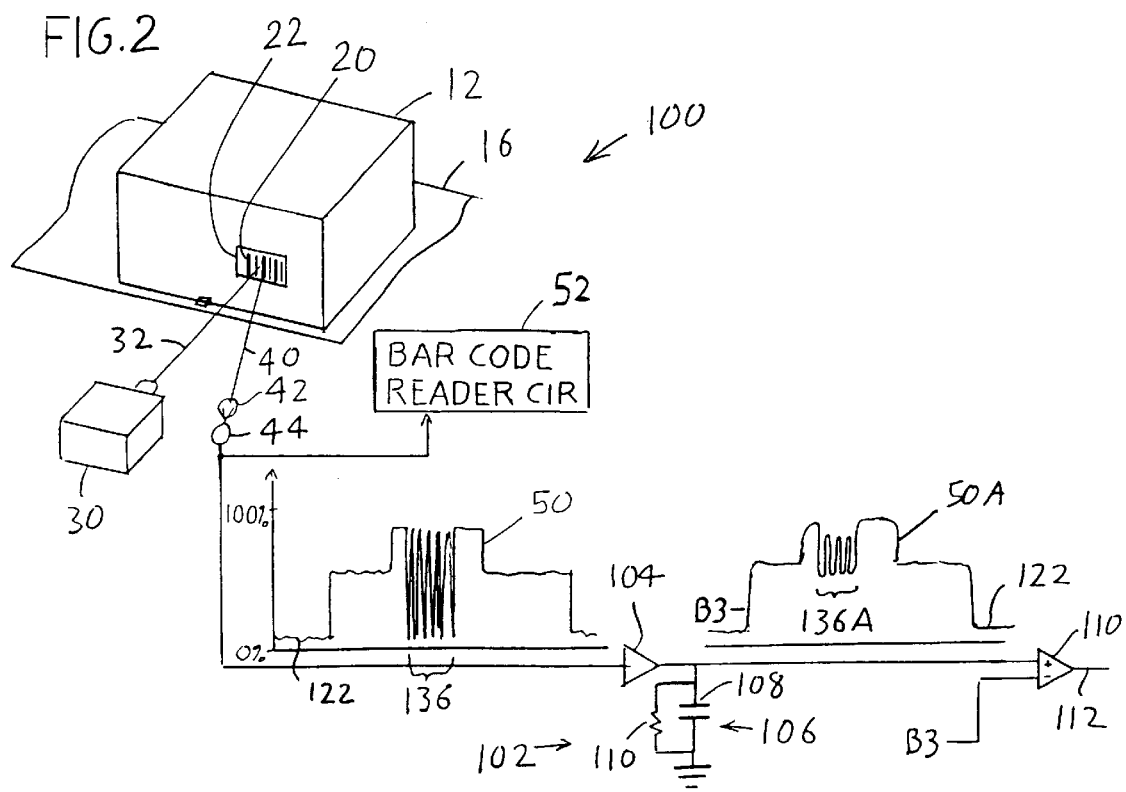
FIG. 2 is a partial isometric view of one embodiment of the invention, of a system for reading bar codes on boxes moving along a conveyor belt, with the system also including apparatus for detecting the leading edge of each container, whether or not there is a bar code on the container.

FIG. 2 illustrates a system 100 of the present invention, which reads bar codes 20 shown printed on bar code labels 22 on boxes 12 that move along a predetermined path on a conveyor belt 16. This system includes a source 30 that produces a scanning laser beam 32 and a lens 42 that concentrates laser beam reflections 40 onto the sensor 44. The output of the sensor 40 is indicated by graph 50. This output is delivered to the bar code reader circuit 52 that detects bar codes and reads them to determine which characters are represented by the bar and space elements of the bar code.

In accordance with the present invention, a box detecting circuit 102 is provided which uses the same output 50 from the laser reflection sensor 44 that is used for the bar code reader circuit 52, to detect the presence of the box 12. In FIG. 2, the circuit 102 includes an amplifier 104 whose output is filtered by a low pass filter 106 comprising a capacitor 108 and a resistor 110 connected to ground. The filter prevents the box detector from being unduly influenced by the low reflectance bars and high reflectance spaces of a bar code. The filtered output of the amplifier 104 passes through a gate 110 which delivers a "box-detected" signal on line 112 that indicates the presence of a box in front of the laser reflection sensor 44. A "box-detected" output appears on line 112 only when the filtered output 50A from the sensor is above a predetermined level B3 that is exceeded by all of the boxes to be detected.

Figure 3:
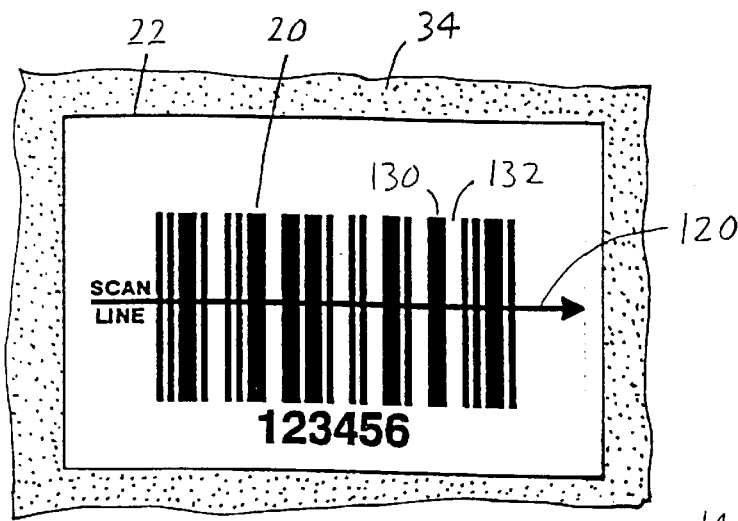
FIG. 3 is a front elevation view of a portion of a box that includes a label with a bar code printed thereon.
Figure 4:
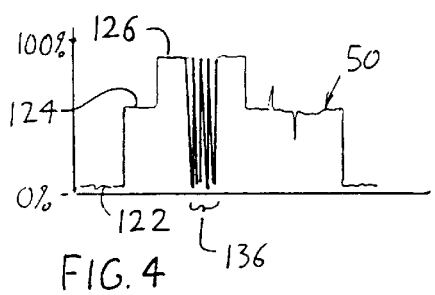
FIG. 4 is a graph showing variation in amplitude with box position, along the conveyor, of the output of the laser reflection sensor, when reading the bar code of FIG. 3.

FIG. 3 shows the characteristics of a typical bar code 20 that is printed on a label 22 that lies on a surface 34 of a box. FIG. 4 shows the output from the laser reflection sensor, as a laser beam scan line 120 passes across the box. In actuality, the scan line 120 rapidly moves back and forth along the length of the scan line 120, although the graph 50 of FIG. 4 indicates the output from points lying progressively along the length of the box surface. In FIG. 4, a first portion 122 of the graph represents the background noise detected by the sensor when no box lies in front of it. When the leading edge of a box moves in front of the sensor, the magnitude of the output rises from near 0% to an in-between level 124 such as 50% of maximum reflection. This continues until the label 22 of FIG. 3 is detected. Since the surface of the label (where it is not printed on) is highly reflective (but diffuse) the output from the sensor rises to a level 126 that is close to 100%.

The bar code 20 of FIG. 3 includes bars, or bar elements 130 that are printed with highly light-absorbent ink, and the sensor output drops to about the level 122 when reflections from a bar element are detected. The bar code also includes spaces or space elements 132 between the bar elements, with the reflectivity at the space elements 132 equal to the reflectivity at the rest of the label. As a result, along the length 136 of the reflection signal representing the bar code, the amplitude of the sensor output repeatedly decreases from the high level 126 to near the low level 122. To avoid the false detection of boxes every time the detector output drops to a low level and then rises to a high level, applicant provides the low pass filter 106 of FIG. 2. As a result of the low pass filter, the amplitude along the length 136 representing a bar code, is filtered to be as shown at 136A in FIG. 2 so the minimum reflectivity never drops close to the level 122 that indicates no box is present.

Figure 5:
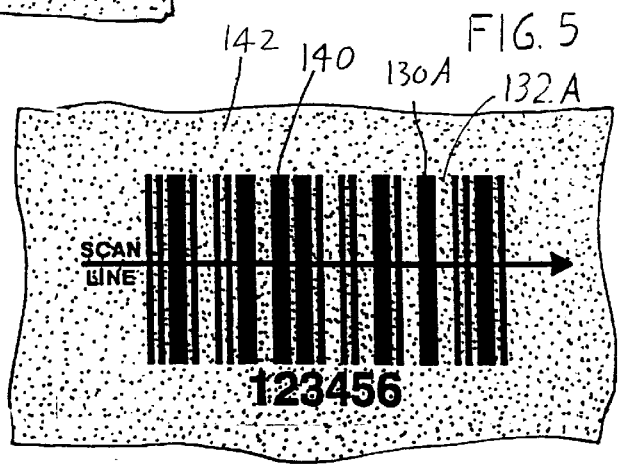
FIG. 5 is a front elevation view of a piece of a box surface on which a bar code has been directly printed.
Figure 6:
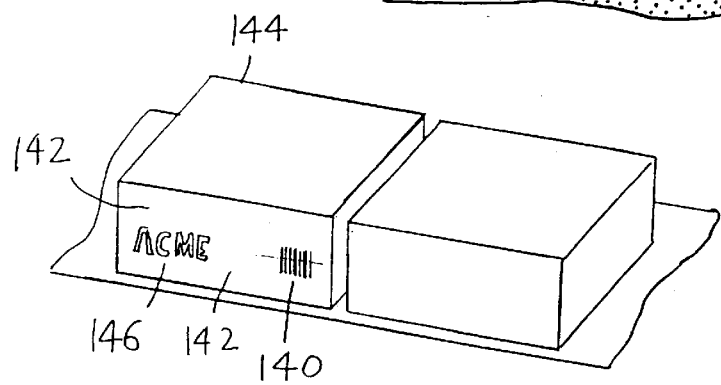
FIG. 6 is an isometric view of a box with the bar code of FIG. 5 and additional markings directly printed thereon.

FIG. 5 illustrates another bar code 140 that is printed directly on the surface 142 of a box. This is shown in FIG. 6, where each box 144 is printed with the bar code 140 on the surface 142. Since the surface 142 is only partially reflecting, the space elements 132A of the bar code of FIG. 5 have only the reflectivity of the surface 142. In addition, it is assumed that the bar elements 130A of the bar code are not printed with almost zero reflective ink, such as special black ink, but are printed with only moderately low-reflectivity brown ink. Such printing of the bar code is accomplished while printing non-bar code characters 146 on the box, such as the name of the company or its brand name.

Figure 7:
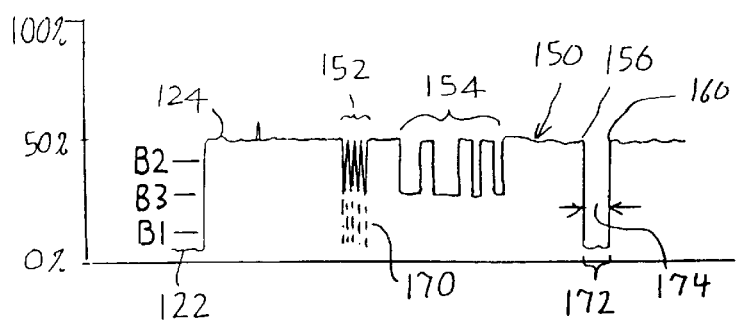
FIG. 7 is a graph showing the output of a laser reflection sensor when detecting reflections of a scanning laser beam directed against the box of FIG. 6.

FIG. 7 shows the output from a laser reflection sensor that senses reflections from the surface 142 of the box 144 of FIG. 6. In the graph 150, the laser reflection sensor output rises from an initial value 122 representing no box to a level 124 representing a portion of the box that has not been printed upon. The level 124 of an unprinted box surface portion may be perhaps 50% of maximum reflectivity. The graph portion 152 represents variation in reflectivity resulting from the bar code 140. It is assumed that the ink reflectivity is at level B3. If a low reflectivity black ink is used to print the bar code, then the reflectivity may drop to the level 122 at the bar elements of the bar code. After the bar code, the laser reflection sensor detects printing in a region 154 which represents characters that may identify the company or the brand name. Assuming that the characters 146 in FIG. 6 are printed with brown ink having only a moderately low reflectivity, the reflectivity will drop to the level B3. When the trailing edge of the box is encountered at 156, the sensor output will drop to the level 122 that indicates that no box is present. The point 160 represents a next box which happens to lie close to the first box.

The circuit 102 of FIG. 2 can be used to detect the presence of a box when the signal is as indicated by graph 150 in FIG. 7. The attainment of a reflectivity above a predetermined level such as B2, indicates passage of the leading edge of a box, and the continued receipt of the signal level above B2 indicates the continued presence of the box. Along the area 152 that represents the bar code, the fact that the output from the sensor has not fallen below a predetermined lower level such as B1 or B3, indicates that the box is still present. If the bar code is printed with low reflectivity black ink, so the output drops to the level 122 indicated by area 170, this can be accounted for in a number of different ways. One way is to use a low pass filter to prevent the passage of the full amplitude of rapid fluctuations in magnitude, such as the low pass filter 106 of FIG. 2. Another way is to avoid the recognition of a drop to the level 122, where the level 122 does not persist for a predetermined distance such as 3 mm (millimeters) which is the maximum width of any bar code element for the most common dimensioned bar code. To be on the safe side, applicant prefers to not recognize any low level of the sensor output that does not persist for at least 6 mm, which represents two wide bar code elements separated by a narrow space element (to account for the event that the space element contains a marking). When the area 154 is encountered, which represents printing on the box, this area is distinguished from the fact that the level B3 at this area is far above the level B1 that is above the "no box" magnitude of the sensor output. The relatively narrow space 172 between the trailing edge 156 of one box and the leading edge 160 of the next box, is detected because the signal level has fallen below B1, to the level 122 indicating no box present, and because the width 174 of the space is at least 6 mm (or some other chosen width). It is noted that if the box contains a wide marking with low reflectivity black ink (as compared to moderate reflectivity brown ink) then the system cannot distinguish between the wide black marking and the space between two boxes (unless an edge of the black marking is close to an edge of the box, which indicates a box of very small dimensions, which indicates that "something is wrong").

As mentioned above, the most common dimensioned bar code has a maximum distance between bar elements on the order of 6 mm. However, it should be noted that large boxes may be printed with large bar codes with corresponding larger maximum spaces between adjacent bar elements. Also, there are very fine dimension codes found on printed circuit boards and electronic components (e.g. integrated circuits). The system can be programmed for the size of bar code and boxes (e.g. components) to be detected.

Figure 8:
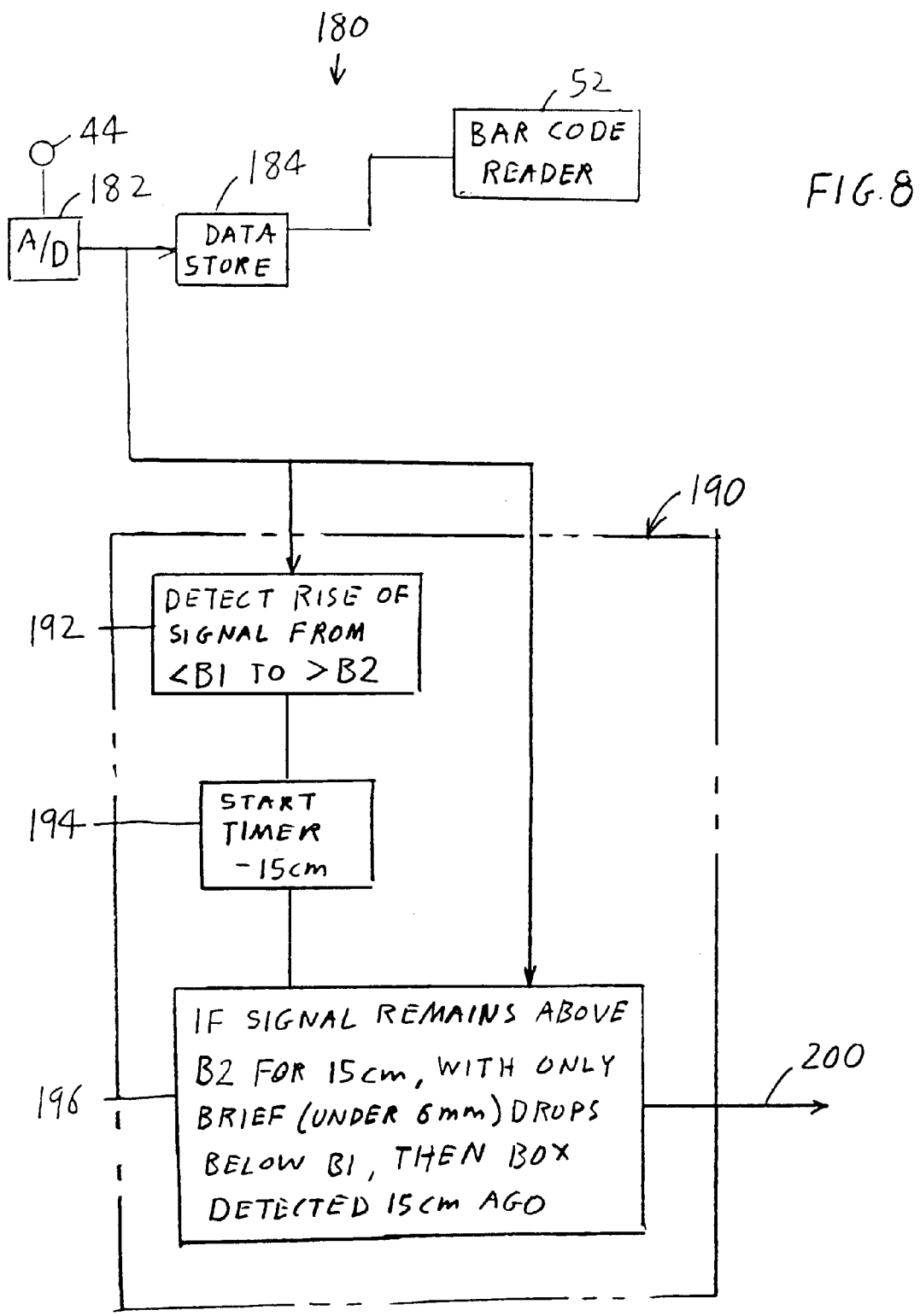
FIG. 8 is a block diagram of a bar code reader and box detector of another embodiment of the invention.

FIG. 8 shows a digital system 180 that is best implemented by a computer, to detect the presence of a box for the situation that gives rise to the graph 150 of FIG. 7. In the system 180, the output from the laser reflection sensor 44 is delivered through an analog-to-digital converter 182 to a data store 184 whose output is delivered to a bar code reader 52. The output from the converter 182 is also delivered to a programmed computer 190. The software of the computer 190 performs a first step indicated at 192, which detects the presence of a box when the output of the sensor rises from less than the level B1 in FIG. 7 to more than the level B2 in FIG. 7. This starts a timer in step 194, with the timer keeping track of a period of time representing movement of boxes along the conveyor by a predetermined length such as 15 cm (centimeters) that represents the shortest box that would pass along the conveyor. During this period, the digital output of the sensor 44 is delivered from the converter 182 to a program portion 196 which detects the continued presence of the box so long as the output in graph 150 of FIG. 7 remains above the level B2, with only brief (under 6 mm length) drops in the level below the level B1. Any drop below B1 lasting less than 6 mm does not represent the end of a box, since it is established that there is at least a distance 174 of 6 mm between two adjacent boxes. At the end of box movement of 15 cm, then an output on line 200 indicates that the leading edge of a box was detected at a location that is now spaced 15 cm downpath from the present location that is being scanned.

Thus, the invention provides an improvement in a system where a laser beam scanner is used to read bar codes on containers such as boxes that move along a predetermined path, which allows the detection of a box without requiring the time and expense of installing a separate box detector. This is accomplished by using the output of the laser reflection sensor, whose output is delivered to a bar code reader to read the bar code, as an input to a box detector to detect a box. The leading edge of a box is detected by a sudden rise in sensor output from a low level that exists when no box is present, to a higher level, with erroneous readings from sudden drops and rises caused by bar codes or printing on the box avoided by circuitry that distinguishes between gaps between boxes, and such markings.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. In a system where cardboard boxes are moved in a predetermined largely horizontal first direction along a defined box path and the boxes contain barcodes that move along a barcode path that is parallel to said box path and the barcodes have vertically elongated bars and spaces, where the boxes are to be detected and the barcodes are to be read, where the system includes a barcode reader that reads a detected barcode, a largely horizontally scanning laser beam source that directs a scanning laser beam at the barcode path, and a laser reflection sensor that detects reflections of the laser beam by producing sensor signals whose magnitude is largely proportionate to the intensity of detected light, where said sensor signals are delivered to said barcode reader, the improvement of apparatus for detecting each container, comprising:

a cardboard box detecting circuit having an input connected to said laser reflection sensor to receive said sensor signals;

said box detecting circuit is constructed to generate a "box-detected" signal indicating detection of a box when the magnitude of the output from said laser reflection sensor increases from a lower level representing no box to above a predetermined level which represents reflections from a box, with said container detecting circuit having a circuit part that ignores an increase in reflectance from a barcode space element or other highly reflective surface that follows a brief decrease from an adjacent barcode bar element or other similarly thin low reflective marking on the box.

2. The system described in claim 1 including:

a data storage device that stores data representing the output of said laser reflection sensor;

said box detecting circuit is constructed to generate a signal indicating detection of a box after said box detecting circuit detects an output from said laser reflection sensor that has a magnitude that increases from a low level representing no box to above a predetermined box-present level which represents reflections from a box, and with the magnitude remaining above said box-present level for at least a predetermined time representing box movement of a plurality of centimeters representing a container of minimum length, with any drops in magnitude lasting no more than a predetermined period representing barcode elements, being ignored.

3. A system for use with box containers generally having flat front vertical surfaces and containing barcodes with vertically elongated low reflective bars and higher reflectance spaces, that move sequentially along a primarily horizontal path with a minimum space between containers, for detecting the containers as well as reading the barcodes, comprising:

a scanning laser source positioned to direct a horizontally scanning laser beam at said path in a direction largely perpendicular to said front vertical surfaces;

a laser reflection sensor positioned to detect reflections of said scanning laser beam;

a barcode reader connected to said sensor to detect and read barcodes scanned by said laser beam;

container detecting means connected to said sensor to which said barcode reader is connected, for generating signals indicating detection of a container, said detecting means constructed to detect the higher reflectance of said container than a space between containers, and to not mistake a bar of a barcode for a space between containers by the small horizontal length of the barcode compared to said minimum space between subsequent containers.

4. A method for use with a system that includes a transport for moving boxes with forwardly-facing vertical surfaces and with barcodes thereon having vertically elongated regular bar and space elements, along a predetermined largely horizontal path, a scanning laser beam source that directs a scanning laser beam at the path of the barcodes, a laser reflection sensor that produces an electrical output representing the amplitude of reflected light, and a barcode reader connected to said sensor, where the method can detect the leading and trailing ends of each box container whether or not the box container has a barcode, comprising:

detecting the passage of the leading end of a container by detection of an increase in magnitude of output from said laser reflection sensor, from a low magnitude representing noise when no container is present in the path of the laser beam, to at least a predetermined higher magnitude representing reflections from an unmarked surface of a container, and the maintenance of such predetermined higher magnitude for longer than a predetermined period of time; and detecting the passage of a trailing end of a container by detecting a decrease in magnitude of output from said laser reflection sensor, from above to below said predetermined higher magnitude and the maintenance of such magnitude of output below said predetermined higher magnitude for longer than at least the period during which one of said bar elements is detected.

* * * * *